United States Patent
Childers

(10) Patent No.: US 11,554,581 B2
(45) Date of Patent: Jan. 17, 2023

(54) LIGHT ENGINE FRAME WITH INTEGRATED BAFFLE

(71) Applicant: Phoseon Technology, Inc., Hillsboro, OR (US)

(72) Inventor: Doug Childers, Portland, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 792 days.

(21) Appl. No.: 16/573,767

(22) Filed: Sep. 17, 2019

(65) Prior Publication Data

US 2020/0009859 A1 Jan. 9, 2020

Related U.S. Application Data

(62) Division of application No. 15/066,662, filed on Mar. 10, 2016, now Pat. No. 10,479,073.

(60) Provisional application No. 62/139,550, filed on Mar. 27, 2015.

(51) Int. Cl.
| B41F 23/04 | (2006.01) |
| F21V 8/00 | (2006.01) |
| B41J 11/00 | (2006.01) |

(52) U.S. Cl.
CPC ........ *B41F 23/0406* (2013.01); *B41F 23/045* (2013.01); *B41J 11/00218* (2021.01); *G02B 6/0001* (2013.01); *G02B 6/0066* (2013.01)

(58) Field of Classification Search
CPC ............ B41F 23/0406; B41F 23/045; B41J 11/00218; B41J 11/0021; G02B 6/0001; G02B 6/0066; G02B 3/06; G02B 3/08; G02B 21/362; B05D 3/007; F21V 15/02; F21V 1/02; F21V 19/001
See application file for complete search history.

(56) References Cited

U.S. PATENT DOCUMENTS

| 6,547,423 | B2 | 4/2003 | Marshall et al. |
| 6,590,220 | B1 | 7/2003 | Kalley et al. |
| 6,682,211 | B2 | 1/2004 | English et al. |
| 6,692,251 | B1 | 2/2004 | Logan et al. |
| 6,710,544 | B2 | 3/2004 | Schliep et al. |
| 6,724,543 | B1 | 4/2004 | Chinniah et al. |
| 6,880,954 | B2 | 4/2005 | Ollett et al. |
| 8,297,801 | B2 | 10/2012 | Coushaine et al. |
| 8,475,010 | B2 | 7/2013 | Vissenberg et al. |
| 10,159,548 | B2 | 12/2018 | Peterson |
| 2001/0046652 | A1 | 11/2001 | Ostler et al. |
| 2002/0085390 | A1 | 7/2002 | Kiyomoto et al. |
| 2006/0018623 | A1 | 1/2006 | Yu et al. |
| 2006/0274529 | A1 | 12/2006 | Cao |

(Continued)

FOREIGN PATENT DOCUMENTS

JP 2014123438 A 7/2014

OTHER PUBLICATIONS

Korean Intellectual Property Office, Office Action Issued in Application No. 10-2016-0034702, dated Aug. 17, 2022, 15 Pages.

*Primary Examiner* — Bradley W Thies
(74) *Attorney, Agent, or Firm* — McCoy Russell LLP

(57) ABSTRACT

Systems are provided for a frame of an optic element of a lighting system. In one example, a baffle frame including extended exterior sidewalls and inner angled walls extending below a bottom surface of the optic element may reduce light reflecting off a workpiece and escaping outside and interior of the baffle frame.

14 Claims, 7 Drawing Sheets

(56) References Cited

U.S. PATENT DOCUMENTS

2007/0002569 A1     1/2007   Ulmer et al.
2011/0085332 A1*   4/2011   Vissenberg .......... G02B 6/0011
                                                    362/311.12

* cited by examiner

LIGHT ENGINE FRAME WITH INTEGRATED BAFFLE

CROSS REFERENCE TO RELATED APPLICATIONS

The present application is a divisional of U.S. patent application Ser. No. 15/066,662 entitled LIGHT ENGINE FRAME WITH INTEGRATED BAFFLE", filed on Mar. 10, 2016. U.S. patent application Ser. No. 15/066,662 claims priority to U.S. Provisional Application No. 62/139,550, entitled "LIGHT ENGINE FRAME WITH INTEGRATED BAFFLE," filed on Mar. 27, 2015. The entire contents of the above-identified applications are hereby incorporated by reference for all purposes.

BACKGROUND/SUMMARY

Solid-state lighting devices have many uses in industrial applications. For example, in printer and coating applications, solid-state lighting devices are typically used to cure photo sensitive material such as coatings, including inks, adhesives, preservatives, etc. In these applications, the light curable material is dispensed/printed onto a surface via a dispensing/printing mechanism and the light output from solid-state lighting devices is directed towards the substrate or material to be cured with the aid of coupling optics. The coupling optics including rod lens, cylindrical lens, Fresnel lens or even flat glass, may be used to channel and focus the light onto the substrate. A photochemical reaction occurring between the incident light and the material cures or "dries" the material.

However, these applications using light to cure the materials face an issue. Any light that escapes/reflects/scatters from the surface of the applied material into the dispenser (e.g., ink dispensing apparatus), may prematurely cure the material in the dispenser before it is applied to the target. The inventors herein have recognized the potential issue of light reflecting back into the dispensing mechanism, and have engineered a way to at least partially address the issues discussed above.

In one example, the issue described above may be at least partially addressed by a frame for holding an optic element of a lighting system, comprising: a central, inner surface formed along a length of the frame and adapted to receive the optic element; first and second vertical sidewalls extending from a top surface to respective first and second bottom surfaces of the frame, the first and second bottom surfaces positioned below an exterior, bottom surface of the optic element when the optic element is mounted to the inner surface of the frame; and first and second angled surfaces, each angled from one of the first and second bottom surfaces and inward toward the inner surface. In this way, light reflecting off a workpiece and back toward the frame may be contained within the frame, thereby reducing light scattering to surrounding objects, including un-cured photo sensitive material in a dispensing system.

As one example, a baffle or beam block may be used to capture the light reflecting off the surface to be cured before it reaches the dispenser. The baffle may have long and flat sides extending along the frame holding the optics. Further still, the baffle may be coated with black anodized material to further absorb the reflected light. In this way, light reflected off the surface may be captured and absorbed by the baffle surrounding the coupling optics. In another example, the baffle may have additional grooves or rough textured surfaces to further scatter the reflected light. The grooves may trap the reflected light, thus reducing the light escaping into the surrounding medium. The baffle may be further integrated into the window frame of the light source itself, thus creating a compact package that can reduce light reflected back towards the lighting system.

The present disclosure may provide several advantages. In particular, the approach may offer a more consistent curing method of photo sensitive material. In addition, by reducing the amount of reflected light from a workpiece upon which curing light is directed, it may further reduce the curing of unapplied photo reactive material, thus reducing wastage and unwanted curing of the photosensitive material.

The above advantages and other advantages, and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
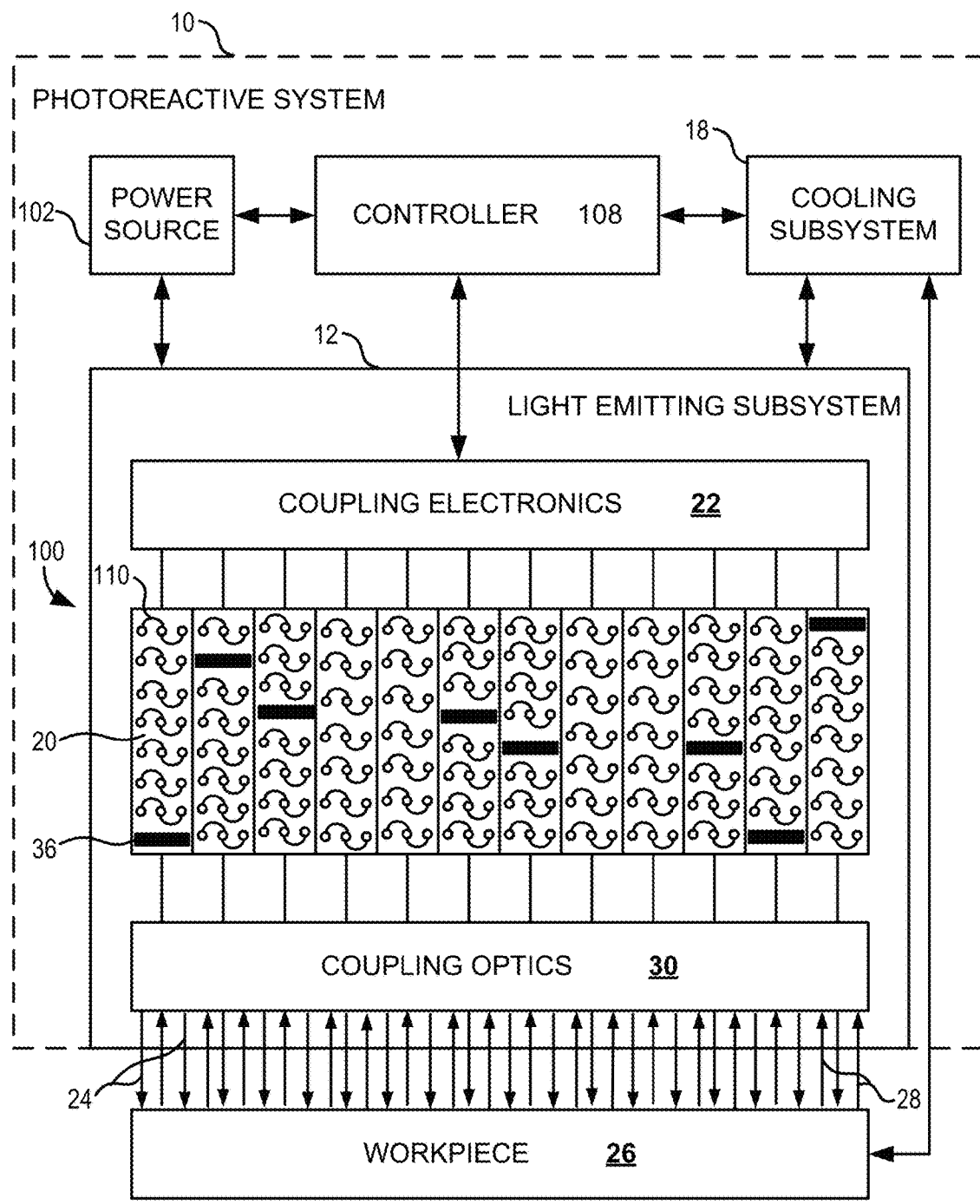
FIG. 1 shows a schematic depiction of a lighting system and associated coupling optics.
Figure 2A:
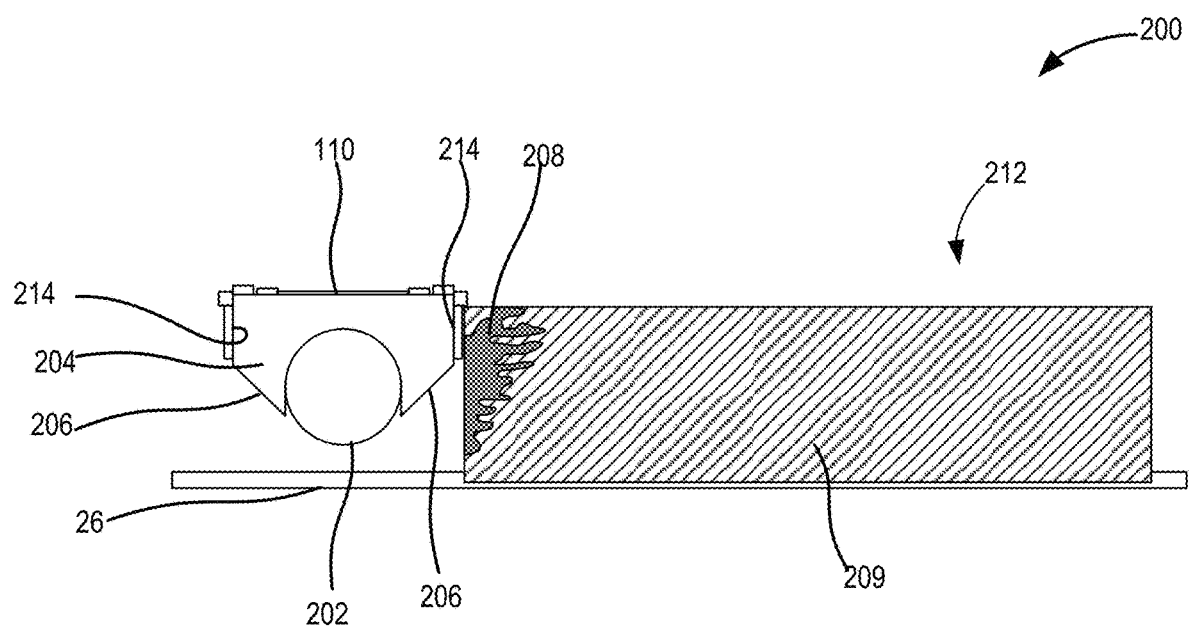
FIGS. 2A and 2B show a profile view of a standard frame and optic of a lighting system with a specular media.
Figure 2B:
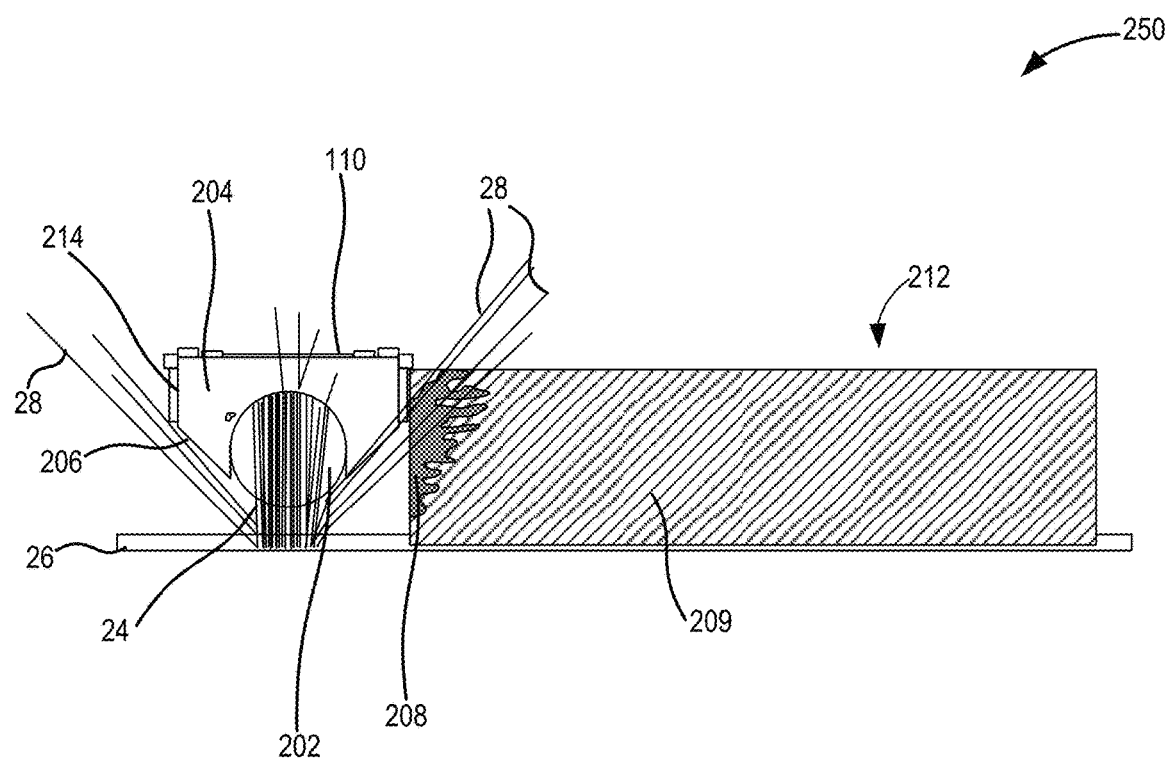
Figure 3A:
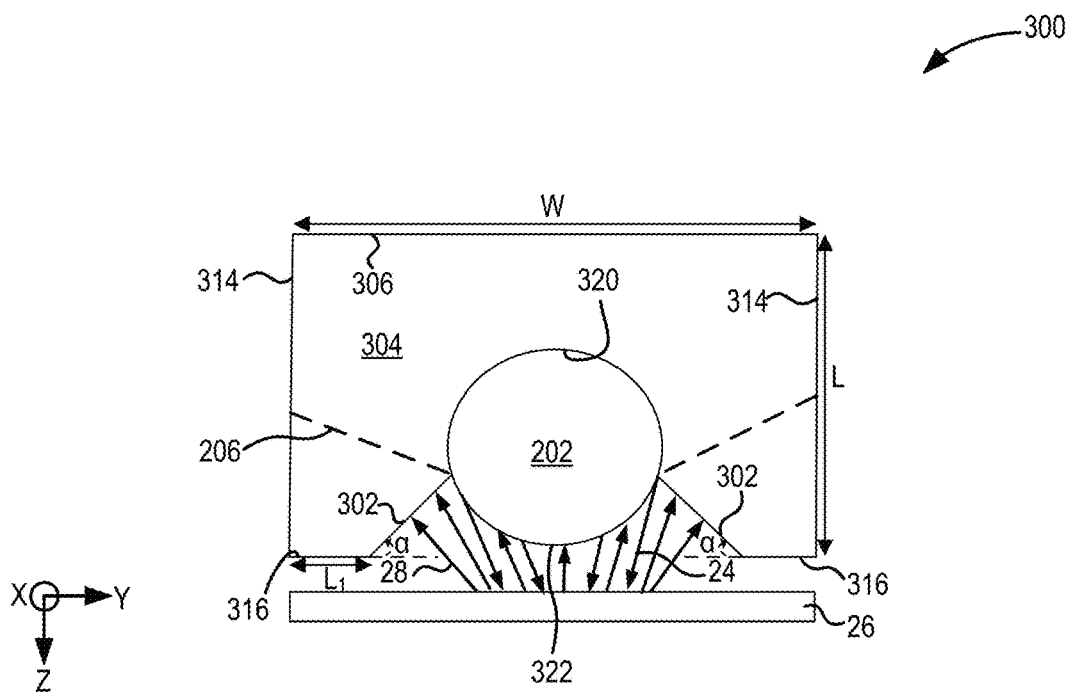
FIGS. 3A and 3B show schematic diagrams of two baffle frame designs integrated with the coupling optics of a lighting system.
Figure 3B:
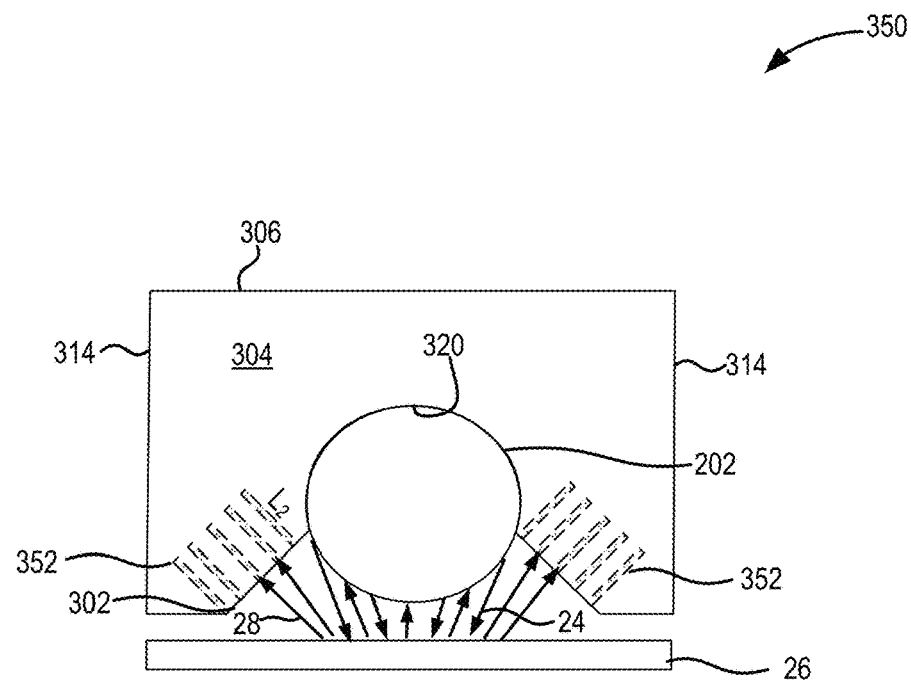
Figure 4:
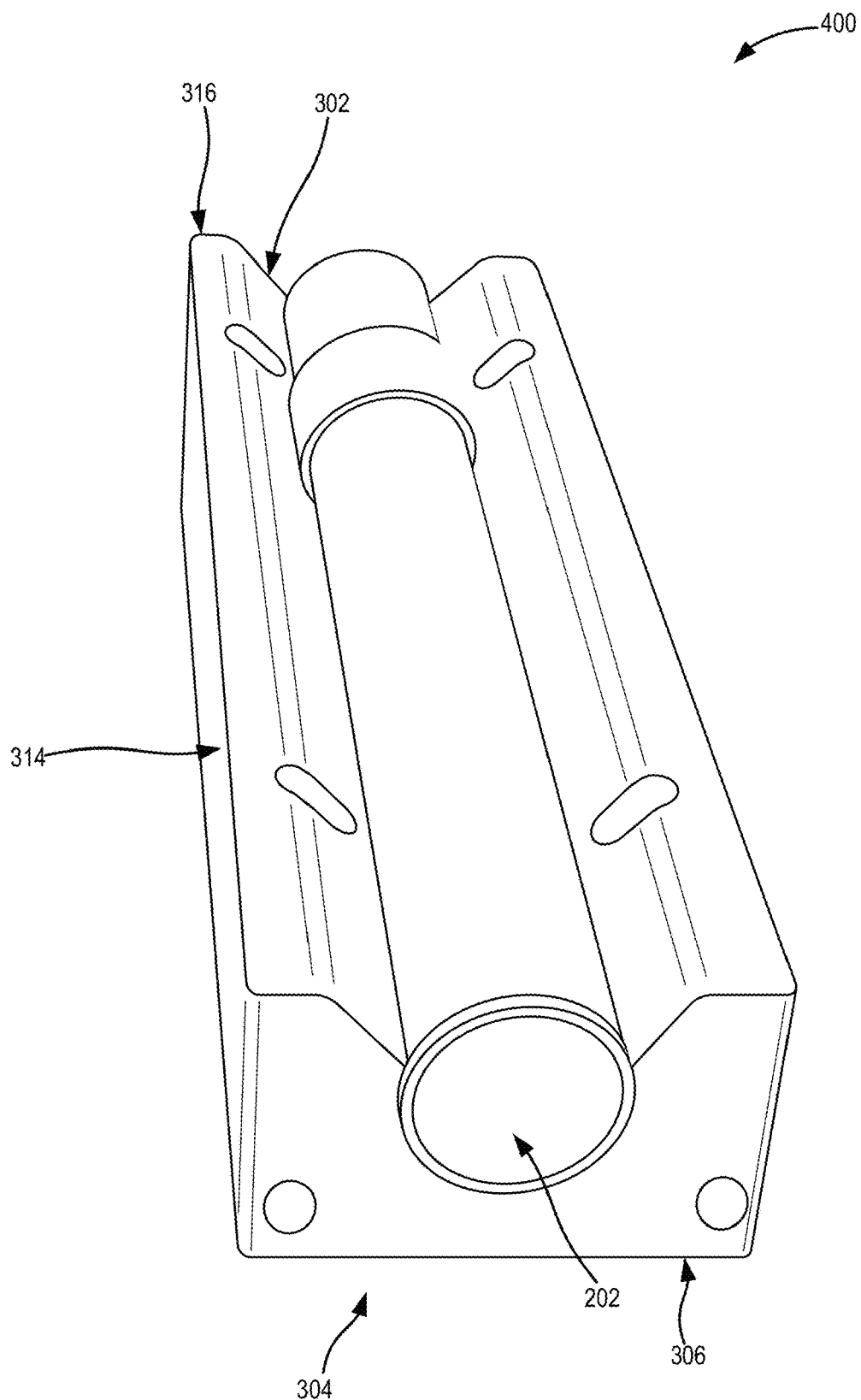
FIG. 4 shows an isometric view of a baffle frame and a rod lens of a lighting system.
Figure 5A:
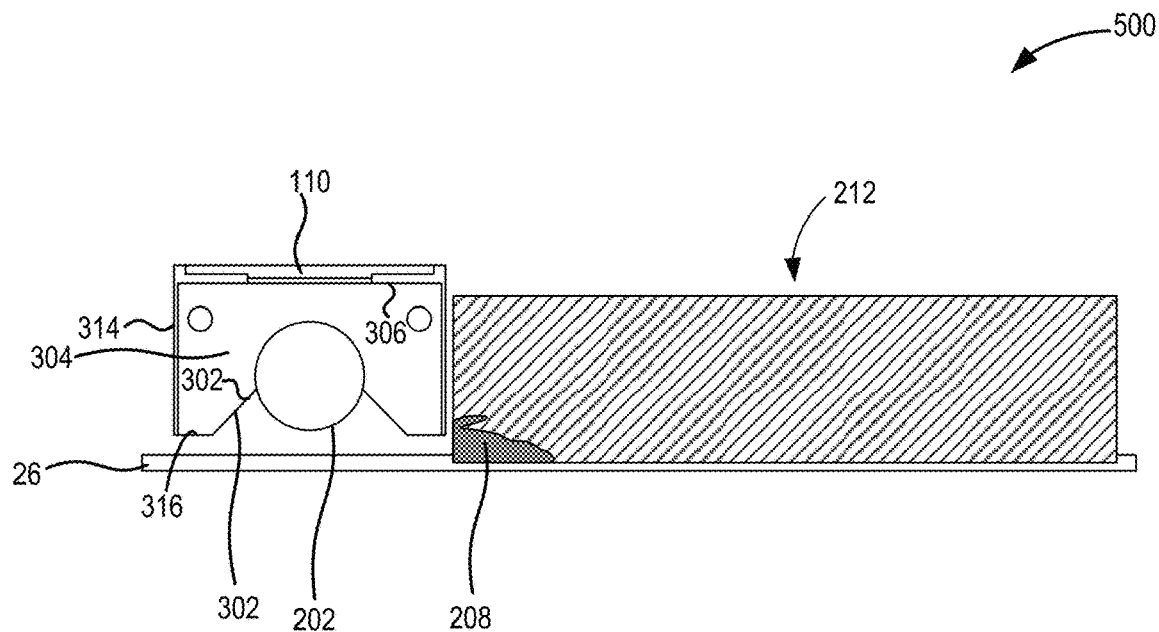
FIGS. 5A and 5B show a profile view of the baffle frame and optic of a lighting system with the specular media.
Figure 5B:
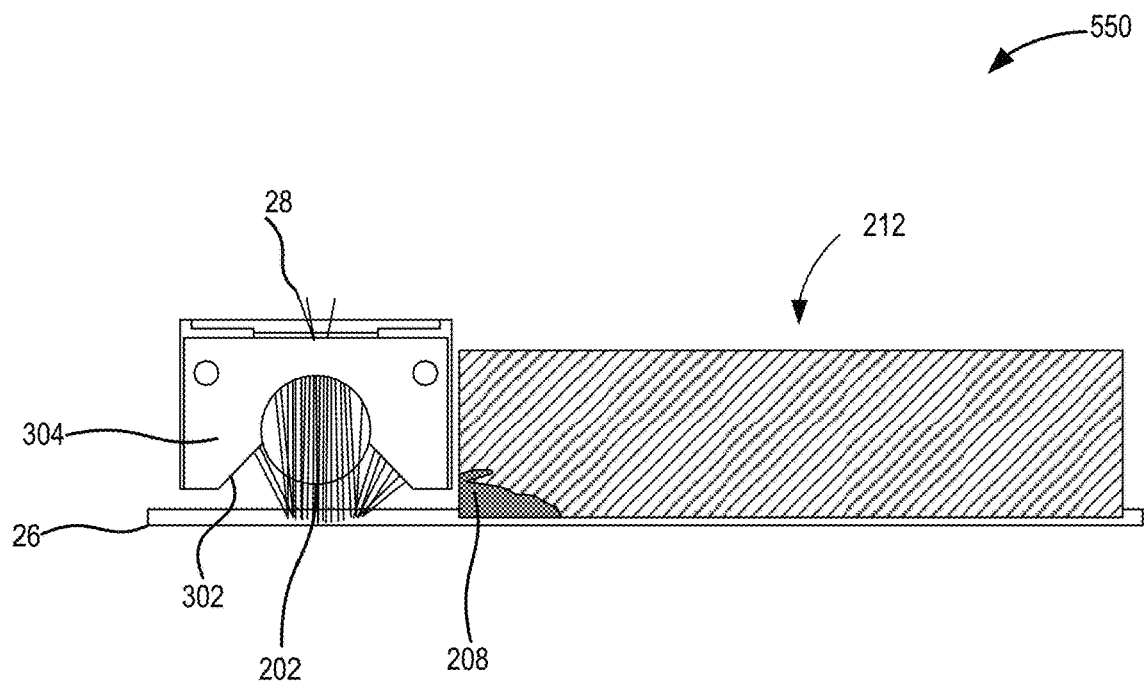
Figure 6A:
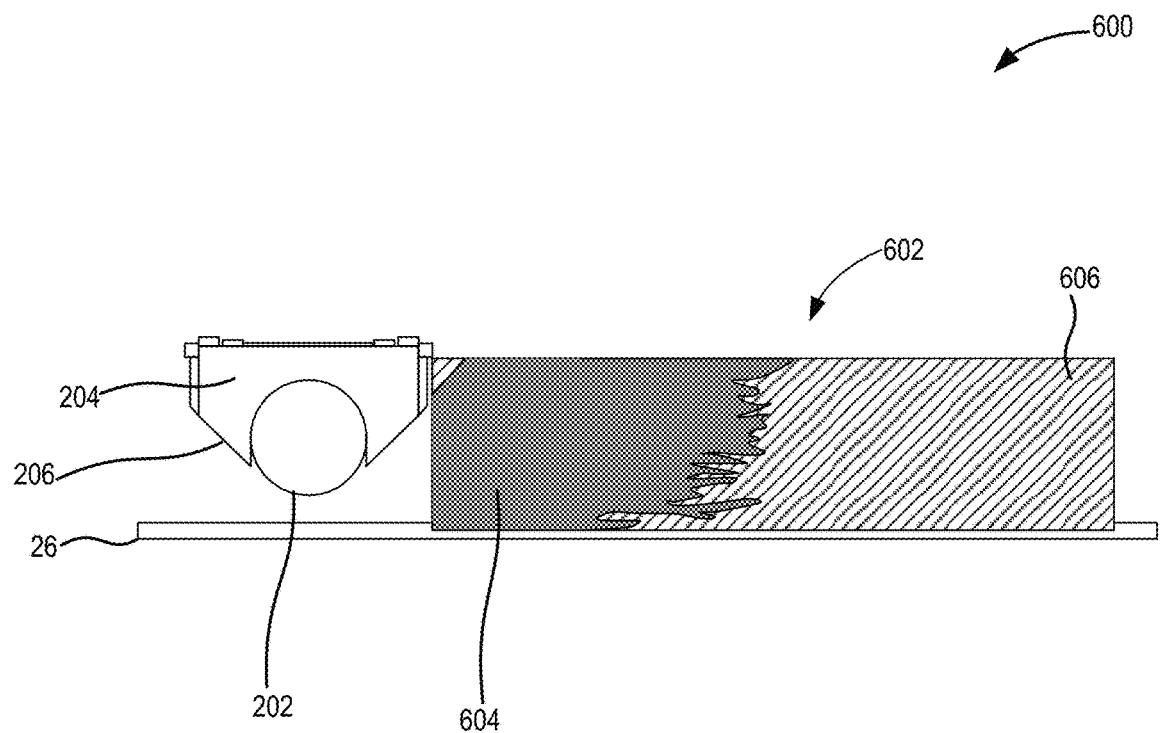
FIGS. 6A and 6B show profile views of the standard frame and the baffle frame of a lighting system with a diffuse media.
Figure 6B:
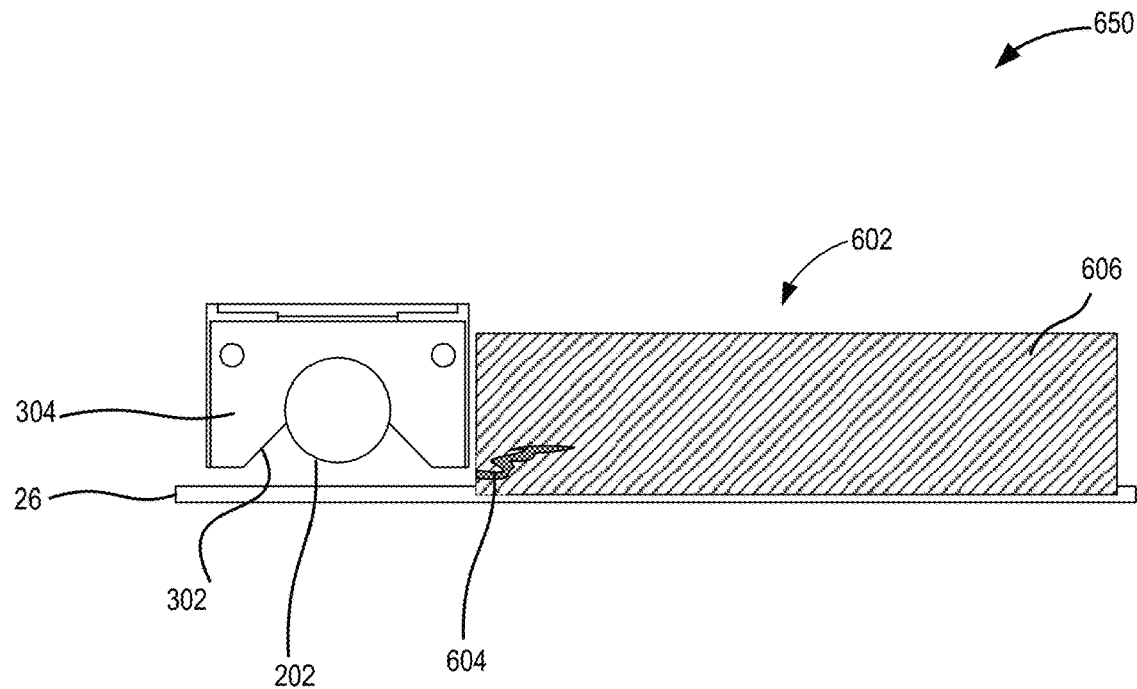

The present description is related to a lighting system used to cure light curable materials. FIG. 1 shows one example lighting system typically used in printer and coating applications that includes a coupling optic for concentrating the incident light onto the applied light curable material. In some embodiments, light may reflect off the applied light curable material (e.g., workpiece upon which the light curable material is deposited) and back into a dispensing mechanism coupled to the lighting system. As a result, light curable material within the dispensing mechanism may cure before it is applied to the target (e.g., workpiece). The light reflecting back into the dispensing mechanism when using a standard frame coupled to the coupling optics of the lighting system is shown at FIGS. 2A-B. As one example, the reflected light may be reduced by adding a baffle or beam block to the frame holding the coupling optics, as shown in FIGS. 3A-B and in FIGS. 7A-B. An example baffle frame coupled to a rod lens of the lighting system is shown in FIG. 4. The reduced light reflections when using the enhanced baffle frame and optic is shown in FIGS. 5A-B. FIGS. 6A-B shows the effect of using the baffle frame and a standard frame with the lighting system for diffuse media cured by the lighting device. In this way, by integrating a light blocking mechanism (such as a baffle) with the coupling optics, reflected light entering the dispensing mechanism may be captured and reduced, thereby reducing premature curing of the unapplied light curable materials.

Referring now to FIG. 1, a block diagram of a photo reactive system 10 in accordance with the system described herein is shown. In this example, the photo reactive system 10 comprises a lighting subsystem 100, a controller 108, a power source 102, a cooling subsystem 18 and coupling optics 30.

The lighting subsystem 100 may comprise a plurality of light emitting devices 110. Light emitting devices 110 may be LED devices, for example. Selected light emitting devices of the plurality of light emitting devices 110 are implemented to provide radiant output 24. The radiant output 24 is directed to a workpiece 26 via coupling optics 30. In one example, the workpiece 26 may be a substrate with a photosensitive material (or light curable material) applied to it, and the light from the light emitting devices 110 may be concentrated onto the material, there by curing or "drying" the material. The photo reactive system 10 may additionally include a dispensing mechanism or dispenser (not shown) for applying the photosensitive material on the substrate, and the light output from the light emitting devices 110 directed onto the workpiece 26 may cure the applied material. The coupling optics 30, may be variously implemented. As an example, the coupling optics may include one or more layers, materials or other structure interposed between the light emitting devices 110 providing radiant output 24 and the workpiece 26. As an example, the coupling optics 30 may include a micro-lens array to enhance collection, condensing, collimation or otherwise the quality or effective quantity of the radiant output 24. As another example, the coupling optics 30 may include a micro-reflector array. In employing such micro-reflector array, each semiconductor device providing radiant output 24 may be disposed in a respective micro-reflector, on a one-to-one basis. As other examples, the coupling optics 30 may include rod lens, cylindrical lens, Fresnel lens, flat glass, etc.

The coupling optics 30 may be employed for various purposes. Example purposes include, among others, to protect the light emitting devices 110, to retain cooling fluid associated with the cooling subsystem 18, to collect, condense and/or collimate the radiant output 24, to collect, direct or reject returned light or radiation 28, or for other purposes, alone or in combination.

Typically, returned or reflected light 28 may be directed back to the lighting subsystem 100 from the workpiece 26 (e.g., via reflection of the radiant output 24). However, the reflected light 28 may interact with the material in the dispenser, or with the surrounding photosensitive material for example, and prematurely cure the photosensitive material before it is even applied to the workpiece 26. An example of reflected light interfering with photosensitive material in a dispensing system is described further below with reference to FIGS. 2A-B. Blocking or re-directing the reflected light 28 such that it does not come into contact with the photosensitive material in the dispensing mechanism may reduce premature curing of the photosensitive material in the dispensing mechanism. As one example, incorporating a baffle or beam block proximate to the coupling optics 30 to absorb, or block, the reflected light 28 may reduce the reflected light 28 directed towards the photosensitive material. As an example, a baffle or beam block coupled to the coupling optics 30 (e.g., a window frame of the light source) may be used to capture the light reflecting off the workpiece 26. Examples of such a beam block are described further below with reference to FIGS. 3-6.

Selected of the plurality of light emitting devices 110 may be coupled to the controller 108 via coupling electronics 22, so as to provide data to the controller 108. As described further below, the controller 108 may also be implemented to control such data-providing semiconductor devices, e.g., via the coupling electronics 22.

The controller 108 preferably is also connected to, and is implemented to control, each of the power source 102 and the cooling subsystem 18. Moreover, the controller 108 may receive data from power source 102 and cooling subsystem 18.

The data received by the controller 108 from one or more of the power source 102, the cooling subsystem 18, the lighting subsystem 100 may be of various types. As an example, the data may be representative of one or more characteristics associated with coupled semiconductor devices 110, respectively. As another example, the data may be representative of one or more characteristics associated with the respective component 12, 102, 18 providing the data. As still another example, the data may be representative of one or more characteristics associated with the workpiece 26 (e.g., representative of the radiant output energy or spectral component(s) directed to the workpiece). Moreover, the data may be representative of some combination of these characteristics.

The controller 108, in receipt of any such data, may be implemented to respond to that data. For example, responsive to such data from any such component, the controller 108 may be implemented to control one or more of the power source 102, cooling subsystem 18, and lighting subsystem 100 (including one or more such coupled semiconductor devices). As an example, responsive to data from the lighting subsystem indicating that the light energy is insufficient at one or more points associated with the workpiece, the controller 108 may be implemented to either (a) increase the power source's supply of current and/or voltage to one or more of the semiconductor devices 110, (b) increase cooling of the lighting subsystem via the cooling subsystem 18 (i.e., certain light emitting devices, if cooled, provide greater radiant output), (c) increase the time during which the power is supplied to such devices, or (d) a combination of the above.

Individual semiconductor devices 110 (e.g., LED devices) of the lighting subsystem 100 may be controlled independently by controller 108. For example, controller 108 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same array of semiconductor devices 110, or may be from more than one array of semiconductor devices 110. Arrays of semiconductor devices 110 may also be controlled independently by controller 108 from other arrays of semiconductor devices 110 in lighting subsystem 100 by controller 108. For example, the semiconductor devices of a first array may be controlled to emit light of a first intensity, wavelength, and the like, while those of a second array may be controlled to emit light of a second intensity, wavelength, and the like.

The cooling subsystem 18 is implemented to manage the thermal behavior of the lighting subsystem 100. For example, generally, the cooling subsystem 18 provides for cooling of such subsystem 12 and, more specifically, the semiconductor devices 110. The cooling subsystem 18 may also be implemented to cool the workpiece 26 and/or the space between the workpiece 26 and the photo reactive system 10 (e.g., particularly, the lighting subsystem 100). For example, cooling subsystem 18 may be an air or other fluid (e.g., water) cooling system.

The photo reactive system 10 may be used for various applications. Examples include, without limitation, curing applications ranging from ink printing to the fabrication of DVDs and lithography. Generally, the applications in which the photo reactive system 10 is employed have associated parameters. That is, an application may include associated operating parameters as follows: provision of one or more levels of radiant power, at one or more wavelengths, applied over one or more periods of time. In order to properly accomplish the photoreaction associated with the application, optical power may be delivered at or near the workpiece at or above a one or more predetermined levels of one or a plurality of these parameters (and/or for a certain time, times or range of times).

In order to follow an intended application's parameters, the semiconductor devices 110 providing radiant output 24 may be operated in accordance with various characteristics associated with the application's parameters, e.g., temperature, spectral distribution and radiant power. At the same time, the semiconductor devices 110 may have certain operating specifications, which may be are associated with the semiconductor devices' fabrication and, among other things, may be followed in order to preclude destruction and/or forestall degradation of the devices. Other components of the photo reactive system 10 may also have associated operating specifications. These specifications may include ranges (e.g., maximum and minimum) for operating temperatures and applied, electrical power, among other parameter specifications.

Accordingly, the photo reactive system 10 supports monitoring of the application's parameters. In addition, the photo reactive system 10 may provide for monitoring of semiconductor devices 110, including their respective characteristics and specifications. Moreover, the photo reactive system 10 may also provide for monitoring of selected other components of the photo reactive system 10, including their respective characteristics and specifications.

Providing such monitoring may enable verification of the system's proper operation so that operation of photo reactive system 10 may be reliably evaluated. For example, the system 10 may be operating in an undesirable way with respect to one or more of the application's parameters (e.g., temperature, radiant power, etc.), any components characteristics associated with such parameters and/or any component's respective operating specifications. The provision of monitoring may be responsive and carried out in accordance with the data received by controller 108 by one or more of the system's components.

Monitoring may also support control of the system's operation. For example, a control strategy may be implemented via the controller 108 receiving and being responsive to data from one or more system components. This control, as described above, may be implemented directly (i.e., by controlling a component through control signals directed to the component, based on data respecting that components operation) or indirectly (i.e., by controlling a component's operation through control signals directed to adjust operation of other components). As an example, a semiconductor device's radiant output may be adjusted indirectly through control signals directed to the power source 102 that adjust power applied to the lighting subsystem 100 and/or through control signals directed to the cooling subsystem 18 that adjust cooling applied to the lighting subsystem 100.

Control strategies may be employed to enable and/or enhance the system's proper operation and/or performance of the application. In a more specific example, control may also be employed to enable and/or enhance balance between the array's radiant output and its operating temperature, so as, e.g., to preclude heating the semiconductor devices 110 or array of semiconductor devices 110 beyond their specifications while also directing radiant energy to the workpiece 26 sufficient to properly complete the photoreaction(s) of the application.

In some applications, high radiant power may be delivered to the workpiece 26. Accordingly, the subsystem 12 may be implemented using an array of light emitting semiconductor devices 110. For example, the subsystem 12 may be implemented using a high-density, light emitting diode (LED) array. Although LED arrays may be used and are described in detail herein, it is understood that the semiconductor devices 110, and array(s) of same, may be implemented using other light emitting technologies without departing from the principles of the description, examples of other light emitting technologies include, without limitation, organic LEDs, laser diodes, other semiconductor lasers.

The plurality of semiconductor devices 110 may be provided in the form of an array 20, or an array of arrays. The array 20 may be implemented so that one or more, or most of the semiconductor devices 110 are configured to provide radiant output. At the same time, however, one or more of the array's semiconductor devices 110 are implemented so as to provide for monitoring selected of the array's characteristics. The monitoring devices 36 may be selected from among the devices in the array 20 and, for example, may have the same structure as the other, emitting devices. For example, the difference between emitting and monitoring may be determined by the coupling electronics 22 associated with the particular semiconductor device (e.g., in a basic form, an LED array may have monitoring LEDs where the coupling electronics provides a reverse current, and emitting LEDs where the coupling electronics provides a forward current).

As one example, a lighting system (such as the lighting system 100 of FIG. 1) includes a frame (e.g., window frame) holding one or more optics (e.g., coupling optics 30 shown in FIG. 1) through which light is directed to a workpiece surface. As described above, the workpiece surface may have photosensitive material disposed thereon from a dispensing mechanism. The dispensing mechanism containing injectable photosensitive material may be positioned proximate to the frame of the lighting system. Referring to FIGS. 2A-B, a first profile view 200 and a second profile view 250 of a standard frame 204 integrated with a coupling optic element 202 is shown. Specifically, FIG. 2A shows an optic element 202 mounted within the frame 204 and positioned proximate to a dispensing mechanism containing photo reactive material 212. FIG. 2B shows the specular interaction between reflected light 28 reflected from the workpiece 26 and the photo reactive material 212.

As shown in view 200 of FIG. 2A, the optic element 202 shown is a rod lens. However, the optic element 202 may alternatively include a cylindrical lens, a Fresnel lens, a flat glass or any other coupling element, as described above with reference to coupling optics 30 in FIG. 1. The frame 204 is integrated with the optic element 202 in such a way that the frame 204 supports the optic element 202. For example, the optic element 202 may be mechanically coupled to and/or mounted within the frame 204. The frame 204 may further include a light source, such as light emitting devices 110.

The frame 204 has two vertical surfaces 214 and two angled surfaces 206. The vertical surfaces 214 are arranged substantially perpendicular to a workpiece 26 upon which light from the light source (e.g., LEDs 110) and optic element 202 is directed onto. The angled surfaces 206 are angled inward from the vertical surfaces 214 and toward the optic element 202. Said another way, the angled surfaces 206 are angled outward from the optic element 202 and toward the vertical surfaces 214. Light incident on the optic element 202 may be concentrated or focused onto the workpiece 26. Photo reactive material 212 contained within a dispensing mechanism may be applied or dispensed onto the workpiece 26. When the light focused by the optic element 202 (indicated by 24 in FIG. 2B) is incident on the work-piece 26, the photo reactive material on the workpiece 26 may be cured or dried.

However, as explained earlier, the light reflecting off the surface may reflect back towards the light emitting device and the photo reactive material within the dispensing mechanism, as indicated by rays 28 in FIG. 2B. The reflected light or rays 28 may further interact with the photo reactive material 212 in the region closest to the lens (indicated as region 208 in FIG. 2B). As a result, the photo reactive material may be prematurely and non-uniformly cured. Depending on the surface of the workpiece 26 and the type of photo reactive material 212, the reflected light may be specular or diffusive in nature. For example, ink on a smooth surface such as mirrors may cause the specular reflections, while ink on a rough surface such as clothing or paper may cause diffuse reflections. In view 250, a specular interaction between the reflected rays 28 and photo reactive material 212 is shown. Thus, light reflected from the surface may interact with the photo reactive material in region 208 and cure the material even before it is applied to the target workpiece 26. The unapplied and uncured photo reactive material 212 is indicated as region 209 in FIGS. 2A-B while the unapplied but prematurely cured photo reactive material (region 208) is indicated in yellow.

By modifying the frame 204 shown in FIGS. 2A-B, the amount of light escaping back towards the light emitting device and the photo reactive material in the dispenser may be reduced. Example designs of lighting frames that reduce light scatter to the dispensing mechanism are shown in the schematic diagrams 300 and 350 of FIGS. 3A and 3B, respectively. Schematic diagrams 300 and 350 show cross-sectional end views of a lighting window frame and lens assembly which may be included as part of a lighting system, such as the lighting system shown in FIG. 1.

Turning first to FIG. 3A, schematic diagram 300 shows an optic element 202 integrated with an enhanced baffle frame 304. The baffle frame or frame 304 is designed to trap the light reflecting off the workpiece which would otherwise exit towards the baffle and the optic element 202 through the angled surfaces 206, as shown in FIGS. 2A-B and indicated by the dashed lines in FIG. 3A. The baffle frame 304 may be an optic holder is further configured to receive and hold the optic element 202. The optic element 202 shown in FIGS. 3A-B is a rod lens. However, the optic element 202 may alternatively include a cylindrical lens, a Fresnel lens, a flat glass or any other coupling element, as described above. The baffle frame 304 is integrated with the optic element 202 in such a way that the frame 204 supports optic element 202. For example, the optic element 202 may be mechanically coupled to and/or mounted within the baffle frame 304. As shown in FIG. 3A, the baffle frame 304 includes a central, inner surface 320 formed along a length of the frame that is adapted to receive the optic element 202. For example, the inner surface 320 is a curved, concave (or recessed) surface and the lens is cylindrical. As such, the inner surface may be in face-sharing contact with an outer surface of the optic element 202. In addition, the curvature of the inner surface 320 may be adaptively adjusted to match the curvature of the optic element 202. In one example, for a rod lens of radius R, the curvature of the inner surface 320 may be substantially equal to the radius R of the rod lens. Further, the baffle frame 304 may be an open surface window frame allowing light to pass from the light source to the optic element. Alternately, the baffle frame 304 may include a light source, such as light emitting devices 110.

The baffle frame 304 includes vertical sidewalls (e.g., vertical surfaces) 314 extending to a length L from a top surface 306 on either side of the baffle frame 304. The vertical sidewalls 314 are arranged substantially perpendicular to a workpiece 26 upon which light from the light source (e.g., LEDs 110) and optic element 202 is directed onto. Herein, the workpiece 26 is arranged along the Y-axis and the vertical sidewalls 314 extend along the Z-axis. The length L of each of the sidewalls 314 extends from the top surface 306 of the baffle frame 304 to a point below a bottom surface 322 of the optic element 202. By extending the length of the vertical sidewalls 314 a distance below the bottom surface of the optic element 202, the reflected light 28 (reflected from the photo sensitive material deposited workpiece) may not escape to the surrounding medium (e.g., may not reach outside of an exterior surface of the baffle frame).

Figure 7A:
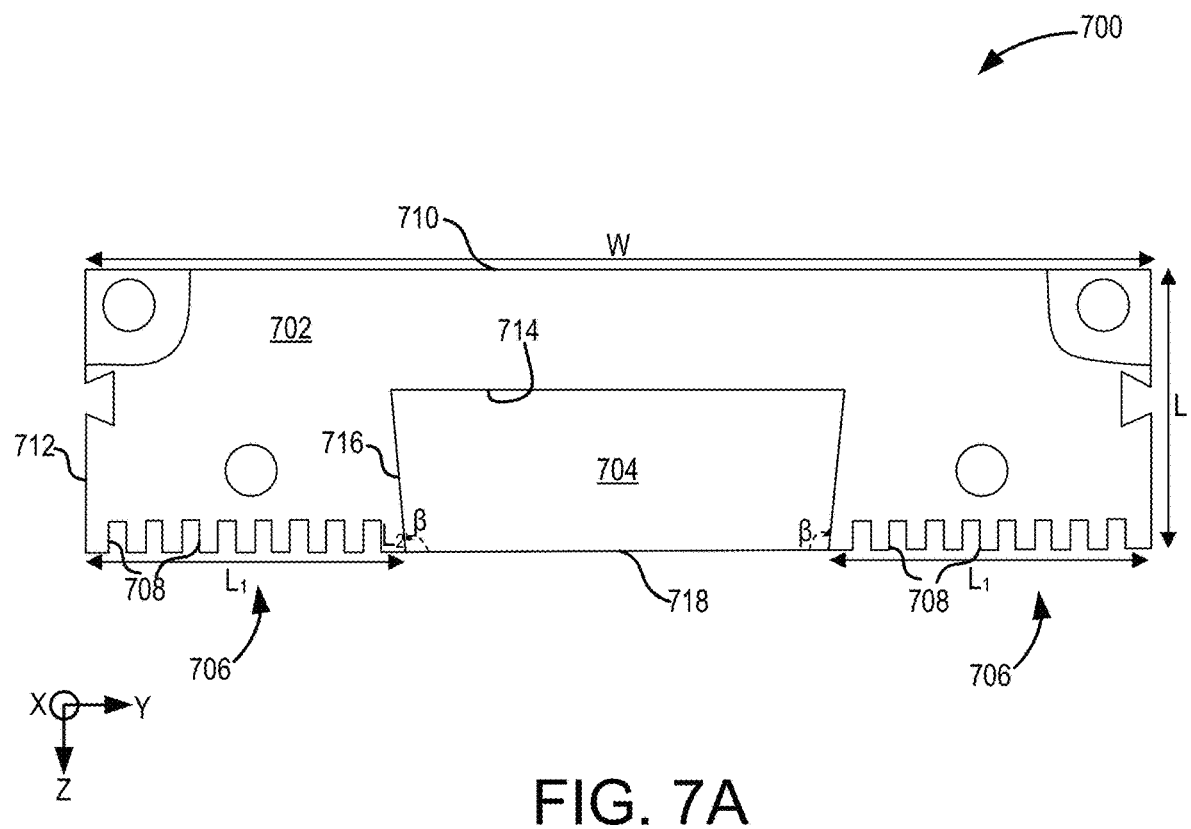
FIGS. 7A and 7B show schematic diagram and partial views of an example frame design integrated with the coupling optics of the lighting system
Figure 7B:
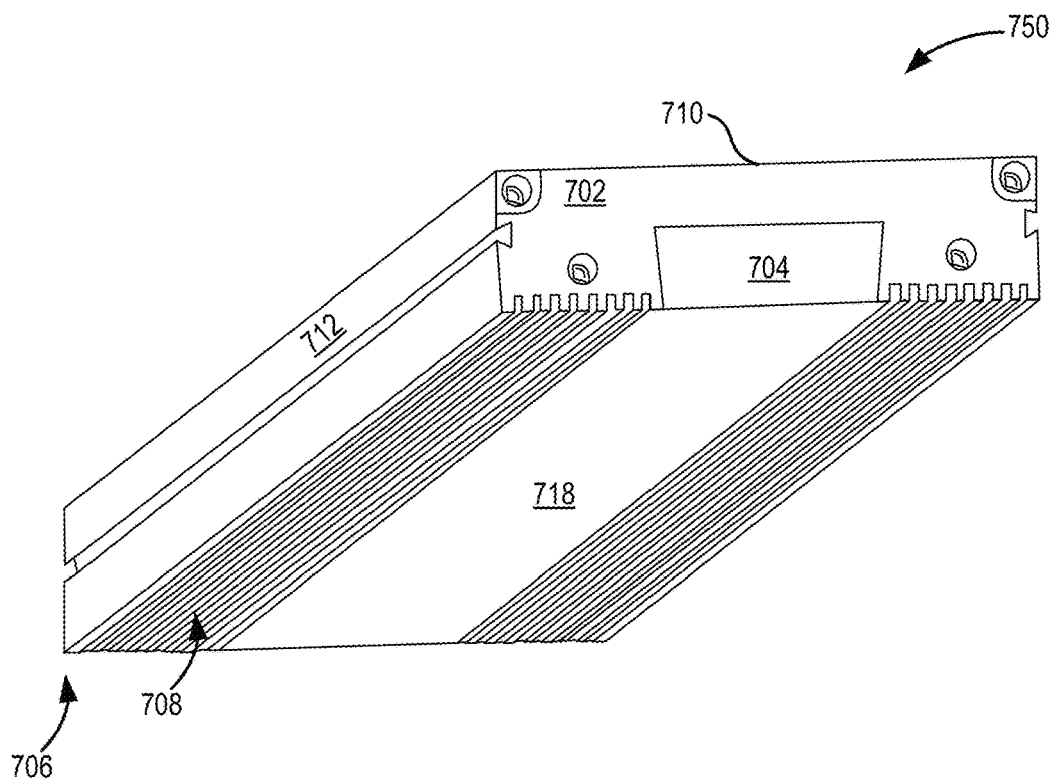

The baffle frame 304 further includes bottom sidewalls (e.g., bottom surfaces) 316 that are arranged horizontally (along Y-axis, for example), in a direction perpendicular to the vertical sidewalls 314. The vertical sidewalls 314 extend from the top surface 306 to the bottom sidewalls 316, wherein the bottom sidewalls 316 are positioned below the bottom surface 322 of the optic element 202. Each of the bottom sidewalls 316 extends horizontally to a length $L_1$ (along Y-axis) between one of the vertical sidewalls 314 and one of two angled sidewalls 302. Each of the angled sidewalls (e.g., angled surfaces) 302 is angled (at an angle $\alpha$ with respect to the horizontal Y-axis, for example) from the bottom sidewall 316 that it is coupled to and toward the optic element 202. Said another way, the angled sidewalls 302 are angled partially vertically and extend inward toward an interior of the baffle frame 304 and away from a bottom surface of the bottom sidewalls 316 and the workpiece 26. As such, the angle may be an acute or an obtuse angle, measured with respect to the horizontal Y-axis and further adjusted based on a shape of the optic element 202. For example, the angle $\alpha$ in FIG. 3A is an acute angle ranging between 0 and 90° (e.g., 0°<$\alpha$<90°) with respect to the horizontal Y-axis. When $\alpha$=0°, for example, the angled sidewalls 302 may be an extension of the bottom sidewalls 316. In such an example, the angled sidewall 302 may extend up to the bottom surface 322 of the optic element 202. An example embodiment including an angled sidewall angled at an angle that is obtuse with respect to the horizontal Y-axis is shown in FIGS. 7A and 7B. Further, the angled sidewalls 302 may be referred to as angled interior surfaces of the baffle frame 304. Furthermore, the angled sidewalls 302 may be angled partially vertically and extend inward towards the optic element 202. Comparing the angled sidewalls 302 of the baffle frame 304 and the angled surfaces 206 of the standard frame 204 shown in FIGS. 2A-B, the angled sidewalls 302 and the angled surfaces 206 extend outward from the optic element 202 in opposite directions.

The angled sidewalls 302 of the baffle frame 304 serve to block the reflected rays 28 from escaping towards the surrounding medium, thereby reducing the amount of light exiting to the side of the lens assembly and around an exterior surface of the baffle frame 304. The angled sidewalls are angled partially vertically and extend inward toward the side of the coupling optic element along a mid-section of the coupling optic element. For example, the combination of the angled sidewalls 302 and the vertical sidewalls 314 extending below the bottom surface of the optic element 202 may capture more reflected rays 28 than the frame shown in FIGS. 2A-B, thereby reducing the amount of light reaching the dispenser containing photo sensitive material. For example, FIG. 3A shows a dashed line indicating where the angled surface 206 of a standard frame, such as the standard frame 204 shown in FIGS. 2A-B, may be positioned. Thus, the baffle frame 304 includes sufficiently more framing material extending below this dashed line and inward toward the optic element 202 than the standard frame 204. Turning to FIG. 3B, another embodiment of the baffle frame 304 including a surface treated angled sidewall 302 is shown. Specifically, schematic diagram 350 shows the angled sidewalls 302 including grooves, or rough texturing, 352. As one example, as shown in FIG. 3B, the angled sidewalls 302 include a plurality of grooves or cutouts 352 extending from an outer surface of each of the angled sidewalls 302 and into an interior of the baffle frame 304. As a non-limiting example, five equally spaced rectangular grooves each of length $L_2$ is shown. Various geometries and spacing of the grooves may be possible, including but not limited to cylindrical geometries, V-shaped geometries, and the like. The grooves 352 may be created by chemically or mechanically etching grooves on the angled sidewall 302 of the baffle frame 304. For example, the baffle frame 304 may be machined using lasers to generate grooves of rectangular patterns. Various geometries of the grooves 352 may be manufactured in a number of ways such as laser etching, scribing, chemical etching, and the like. In another example, the angled sidewalls 302 may alternatively or additionally include surface texturing, such as bumps, depressed surfaces, rough texturing, or the like. The reflected light 28 incident on the grooves or rough texturing may undergo additional scattering inside the grooves/or at the rough texture, thereby reducing the amount of light transmitted back into the surrounding medium and outside of the baffle frame 304. Herein, the grooves 352 are formed on the angled sidewalls 302. However, in other example embodiments, the grooves may be formed on bottom surfaces of the baffle frame as shown in FIGS. 7A and 7B.

Turning first to FIG. 7A, schematic diagram 700 shows an optic element 704 integrated with an enhanced baffle frame 702. The baffle frame 702 may be an example of the baffle frame 304 described earlier with reference to FIGS. 3-6. The optic element 704 may be an example of the optic element 202 described with reference to FIGS. 3-6. The baffle frame or frame 704 is designed to trap the light reflecting off the workpiece which would otherwise exit towards the baffle and the optic element 704. The baffle frame 702 may be an optic holder is further configured to receive and hold the optic element 704. The optic element 704 shown in FIGS. 7A and 7B include a polygonal cross-section. The baffle frame 702 is integrated with the optic element 704 in such a way that the frame 702 supports optic element 704. For example, the optic element 704 may be mechanically coupled to and/or mounted within the baffle frame 702. As shown in FIG. 7A, the baffle frame 702 includes a central, inner surface 714 formed along a length of the frame that is adapted to receive the optic element 704. For example, the inner surface 714 is a flat surface extending along the horizontal Y-axis. The optic element 704 includes a trapezoidal cross-section, and the inner surface 714 of the frame 702 is parallel to a top outer surface of the optic element 704. As such, the inner surface 714 may be in face-sharing contact with the top outer surface of the optic element 704. In addition, a length and width of the inner surface 714 may be adaptively adjusted to match a length and width of the optic element 704. In one example, for an optic element of length l and width w, the length and width of the inner surface 714 may be substantially equal to the length l and width w of the optic element 704. Further, the baffle frame 702 may be an open surface window frame allowing light to pass from the light source to the optic element. Alternately, the baffle frame 702 may include a light source, such as light emitting devices 110.

Similar to the baffle frame 304 of FIGS. 3A and 3B, the baffle frame 704 includes vertical sidewalls (e.g., vertical surfaces) 712 extending to a length L from a top surface 710 on either side of the baffle frame 702. The vertical sidewalls 712 are arranged substantially perpendicular to a workpiece (not shown in FIG. 7A) upon which light from the light source (e.g., LEDs 110) and optic element 704 is directed onto. Herein, the workpiece may be arranged along the horizontal Y-axis and the vertical sidewalls 714 may extend along the vertical Z-axis. The length L of each of the sidewalls 712 extends from the top surface 710 of the baffle frame 702 to bottom surfaces 706 of the baffle frame 702. Herein, the bottom surface (or bottom sidewall) 706 of the baffle frame 702 may be arranged horizontally (along Y-axis, for example), in a direction perpendicular to the vertical sidewalls 712. Further, the bottom surface 706 may be at the same level as a bottom surface 718 of the optic element 704. In contrast the vertical sidewalls 206 (FIGS. 3A and 3B) which extend beyond the bottom surface 322 of the optic element 202, the vertical sidewall 712 of baffle frame 702 extends up to (and not beyond) the bottom surface 718 of the optic element 704. Each of the bottom sidewalls 706 extends horizontally to a length $L_1$ (along Y-axis) between one of the vertical sidewalls 712 and one of two angled sidewalls 716. Each of the angled sidewalls (e.g., angled surfaces) 712 is angled (at an angle β with respect to the horizontal Y-axis, for example) from the bottom sidewall 316 that it is coupled to and toward the optic element 704. Herein, the angle β is an obtuse angle, ranging between 90° and 180° (e.g., 90°≤β<180°). For example, when β=90°, the angled sidewall 712 may be perpendicular to the bottom surface 706, and further parallel to the vertical sidewall 712 of the baffle frame 704. Said another way, the angled sidewalls 716 are angled partially vertically and extend toward an interior of the baffle frame 704 and away from the bottom surface 706 and the workpiece (not shown in FIG. 7A). Similar to angle α of FIG. 3A, the angle β may be adjusted based on a shape of the optic element 704. In FIG. 7A, the angle β may be about 100° with respect to the horizontal Y-axis, adjusted to match the trapezoidal cross-section of the optic element 704. Further, the angled sidewalls 716 may be referred to as angled interior surfaces of the baffle frame 704.

The angled sidewalls 716 of the baffle frame 702 serve to block the reflected rays from escaping towards the surrounding medium, thereby reducing the amount of light exiting to the side of the lens assembly and around an exterior surface of the baffle frame 702. Thus, the baffle frame 702 includes sufficiently more framing material than a standard frame (such as standard frame 204 of FIG. 2A). Similar to FIG. 3B, the baffle frame 702 may include including grooves, or rough texturing 708. As opposed to being on the angled surfaces as shown in FIG. 3B, the grooves and/or surface texturing 708 may be formed on the bottom surfaces of the baffle frame 702. As one example, the bottom sidewalls 706 may include a plurality of grooves or cutouts 708 extending from an outer surface of each of the bottom sidewalls 706 vertically into an interior of the baffle frame 702. As a non-limiting example, eight equally spaced rectangular grooves each of length $L_2$ formed on each of the bottom sidewalls 706 is shown. Various geometries and spacing of the grooves may be possible, including but not limited to cylindrical geometries, V-shaped geometries, and the like. The grooves 708 may be created by chemically or mechanically etching grooves on the bottom sidewall 708 of the baffle frame 702. For example, the baffle frame 702 may be machined using lasers to generate grooves of rectangular patterns. Various geometries of the grooves 708 may be manufactured in a number of ways such as laser etching, scribing, chemical etching, and the like. In another example, the bottom sidewalls 706 may alternatively or additionally include surface texturing, such as bumps, depressed surfaces, rough texturing, or the like. Reflected light incident on the grooves or rough texturing may undergo additional scattering inside the grooves/or at the rough texture, thereby reducing the amount of light transmitted back into the surrounding medium and outside of the baffle frame 702. Herein, the grooves 708 may extend throughout the bottom surface 708 of the baffle frame 702 as shown in FIG. 7B. Turning to FIG. 7B, a partial non-limiting example side view 750 of the baffle frame 702 is shown. The grooves 708 are formed on the bottom sidewalls 706 of the baffle frame 702. As such, the light may undergo additional scattering inside and along the grooves 708. In one embodiment, the baffle frame 702 may be coated with and/or comprised at least partially or entirely of a material that absorbs light, thereby further reducing stray light reflections from escaping around the baffle frame 702. In view 750, the planar sides of the baffle frame 702 are black anodized to reduce light scattering by absorbing the reflected light. For example, each of the vertical sidewalls 712, planar, bottom sidewalls 706, horizontal top surface 710, and angled sidewalls 716 may be coated or comprised entirely of the black anodized material. Alternately, while the rest of the baffle is anodized black, the bottom sidewalls 706 alone may be coated with a reflective material to reflect the light rays back onto the workpiece positioned below the baffle frame 712.

In another embodiment, the baffle frame 304 shown in FIG. 3A may be coated with and/or comprised at least partially or entirely of a material that absorbs light, thereby further reducing stray light reflections from escaping around the baffle frame 304. FIG. 4 shows an isometric view of an example baffle frame 304 with flat (e.g., relatively planar) sides that are black anodized to reduce light scattering by absorbing the reflected light. For example, each of the vertical sidewalls 314, planar, bottom sidewalls 316, horizontal top surface 306, and angled sidewalls 302 may be coated or comprised entirely of the black anodized material. Alternately, while the rest of the baffle is anodized black, the angled sidewalls 302 alone may be coated with a reflective material to reflect the light rays 28 back onto the workpiece 26.

Thus, an example frame for holding an optic element of a light system is shown. The frame comprises a central, inner surface formed along a length of the frame and adapted to receive the optic element, first and second vertical sidewalls extending from a top surface to respective first and second bottom surfaces of the frame, the first and second bottom surfaces positioned below or in level with an exterior, bottom surface of the optic element when the optic element is mounted to the inner surface of the frame, and first and second angled surfaces, each angled from one of the first and second bottom surfaces and inward toward the inner surface. Additionally or alternatively, the first and second angled surfaces may be interior surfaces of the frame. Additionally or alternatively, wherein the first and second vertical sidewalls may be arranged perpendicular to a workpiece upon which light from the optic element may be directed. Additionally or alternatively, the first and second bottom surfaces may be arranged horizontally, in a direction perpendicular to the vertical sidewalls and wherein each of the first and second bottom surfaces may extend horizontally between one of the first and second vertical sidewalls and one of the first and second angled surfaces. Additionally or alternatively, each of the bottom surfaces may extend horizontally between one of the first and second vertical sidewalls and one of the first and second angled sidewalls. Additionally or alternatively, the inner surface may be a curved, concave surface and the optic element may be cylindrical. Additionally or alternatively, the optic element may be one of a cylindrical lens, rod lens, a Fresnel lens, or flat glass. Additionally or alternatively, the optic element may be a coupling optic that directs radiant output from a plurality of light emitting devices of the lighting system to a workpiece, where the workpiece may be a substrate with a photosensitive material applied to it. Additionally or alternatively, one or more of the first and second angled surfaces may include one or more grooves extending from an exterior surface of the first and the second angled surfaces and into and interior of the frame. Additionally or alternatively, one or more of the first and second angled surfaces may include surface texturing. Additionally or alternatively, the frame may comprise a black anodized material. Additionally or alternatively, one or more of the first and second vertical sidewalls, the first and second bottom surfaces, and the first and second angled surfaces may be coated with a black anodized material.

Thus, an example optic holder of a lighting system, comprises a top surface coupled to a light source, first and a second bottom surface parallel to the top surface, first and a second vertical sidewall extending from the top surface to a respective one of the first and the second bottom surface, first and a second angled surface extending from a respective one of the first and the second bottom surface towards a central recessed surface, the central recessed surface capable of holding a rod lens, and wherein each of the first and the second angled surface include one or more cutouts extending to a length inside the optic holder towards the respective first and second vertical sidewall. Additionally or alternatively, a radius of the central recessed surface may be substantially equal to a radius of the rod lens.

Referring to FIGS. 5A-B, a first profile view 500 and second profile view 550, showing reflected rays 28, of the enhanced baffle frame integrated with a coupling optic element are shown. In view 500 of FIG. 5A, the optic element 202 shown is a rod lens, however in alternate embodiments the optic element 202 may include a cylindrical lens, a Fresnel lens, a flat glass or any other coupling element as described with reference to coupling optics 30 in FIG. 1. The baffle frame 304 is integrated onto an optic element 202 in such a way that it supports the optic element 202 and a light source 110, as shown. As explained earlier, the baffle frame 304 may be coupled to an exterior, top surface of the coupling optic, the frame including vertical sidewalls 314 extending to a point below an exterior, bottom surface of the coupling optic and angled sidewalls angled 302 from the point and inward toward the coupling optic. As such, the angled sidewalls 302 are angled inward toward a side of the coupling optic element 202 along a mid-section of the coupling optic element 202.

The light source is a light emitting device (such as semiconductor devices 110) positioned above the baffle frame 304 at a top open surface 306 of the baffle frame 304. In one example, the top surface 306 may be include a window capable of allowing light from the light emitting device 110 to pass to the optic element 202. As explained earlier with reference to FIG. 2, the incident light may be concentrated or focused onto the workpiece 26. The photo reactive material 212 applied or dispensed onto the workpiece 26 may be cured or dried by focusing the incident light onto the material. Herein, a dispenser mechanism containing the photo reactive material 212 may be arranged proximate to the baffle frame 304. However, as explained earlier, the light reflecting off the surface may get reflected back towards the light emitting device and the photo reactive material, as indicated by rays 28 in view 550 of FIG. 5B. The reflected rays 28 interacting with the photo reactive material in the region closest to the lens assembly (indicated as region 208 in FIG. 5B), may lead to premature and non-uniform curing of the photo reactive material in region 208, as explained above with reference to FIG. 2. However, with the enhanced baffle frame 304, most of the light reflected from the surface gets trapped within an interior of the baffle frame 304. By comparing region 208 in FIGS. 2B and 5B (or the yellow regions of FIGS. 2B and 5B), it can be seen that the enhanced baffle frame reduces the amount of light exiting the frame. In one example, the enhanced baffle frame 304 may reduce the light reflected into the surrounding medium by 66% when compared to the standard frame setting. As explained earlier, the reflected light may be specular or diffusive depending on the surface. While specular reflection occurs when the surface is smooth, like a mirror for example, diffuse reflection occurs when the reflection occurs on a rough surface. Diffuse reflections may further cause a spread in the reflected light, thereby exposing a larger region of the photo reactive to premature curing, as shown at FIGS. 6A-B.

Thus, an example lighting system is shown. The lighting system comprises a light source, a coupling optic positioned between the light source and a workpiece to be cured by light from the light source, and a frame coupled to an exterior, top surface of the coupling optic, the frame including vertical sidewalls extending to a point below an exterior, bottom surface of the coupling optic and angled sidewalls angled from the point and inward toward the coupling optic. Additionally or alternatively, the light source may be a light emitting device and wherein the light source may be positioned above the frame, at a top, open surface of the frame, the top, open surface of the frame being a window frame allowing light to pass from the light source to the coupling optic. Additionally or alternatively, the angled sidewalls may be angled inward toward a side of the coupling optic along a mid-section of the coupling optic, the coupling optic including one or more of a rod lens, a cylindrical lens, a Fresnel lens, or flat glass. Additionally or alternatively, the frame further may comprise bottom sidewalls that extend horizontally, in a direction perpendicular to the vertical sidewalls, each sidewall of the bottoms sidewalls extending from one of the vertical sidewalls to one of the angled sidewalls. Additionally or alternatively, the frame may at least partially comprise a black anodized material and wherein one or more of the angled sidewalls may include one or more of grooves extending from an exterior surface of the one of more angled sidewalls into an interior of the frame and surface texturing. Additionally or alternatively, the lighting system may further comprise a dispenser mechanism containing photosensitive material arranged proximate to the frame.

Turning to FIGS. 6A-B, view 600 shows a profile view of the standard frame with a diffuse media and view 650 shows a profile view of a baffle frame with diffuse media. The diffuse reflections off the rough workpiece 26 may reflect into the photo reactive material 602 by escaping through the side of the standard frame 204, below the angled surfaces 206. This may cause photo reactive material in region 604 to be cured before being applied to the workpiece. The unapplied and uncured photo reactive material 212 is indicated as region 606 in FIGS. 6A-B while the unapplied but prematurely cured photo reactive material (region 208) is indicated as region 604. The region 604 in FIG. 6A may include various levels of interaction between the reflected light and the diffuse media. As an example, areas of region 604 that are closer to the frame 204 may undergo more interaction, while areas of region 604 that are further away from the frame 204 may undergo lesser interaction. The shaded region 606 indicates no interaction, for example. However, with the enhanced baffle frame 304 integrated to the optic element 202, the reflected light may be trapped by the angled sidewalls 302, as explained above with reference to FIGS. 3A-B, thereby reducing the amount of light escaping from the baffle frame 304 and thus reducing the amount of photo reactive material that is cured in region 604. This is shown in view 650. In one example, the enhanced baffle frame reduces the amount of light exiting by 83% when compared to the standard frame (e.g., compare the green/yellow regions between FIGS. 6A and 6B).

In this way, by integrating the baffle frame to the concentrating optics, light reflected from the surface may be further captured. The technical effect of reducing light reflected from the surface is that the amount of light reflected back into the print head may be reduced. In one example, the baffle may have black anodized sides that can further absorb the reflected light, thereby reducing the chance of the escaping light prematurely curing the unapplied photo reactive material.

The systems described above provide for a frame for holding an optic element of a lighting system, comprising a central, inner surface formed along a length of the frame and adapted to receive the optic element, first and second vertical sidewalls extending from a top surface to respective first and second bottom surfaces of the frame, the first and second bottom surfaces positioned below an exterior, bottom surface of the optic element when the optic element is mounted to the inner surface of the frame, and first and second angled surfaces, each angled from one of the first and second bottom surfaces extending partially vertically toward the inner surface. In a first example, the frame may additionally or alternatively include wherein the first and second angled surfaces may be interior surfaces of the frame. A second example of the frame optionally includes the first example and further includes wherein the first and second vertical sidewalls may be arranged perpendicular to a workpiece upon which light from the optic element is directed. A third example of the frame optionally includes one or more of the first and the second examples, and further includes wherein the first and second bottom surfaces may be arranged horizontally, in a direction perpendicular to the vertical sidewalls and wherein each of the first and second bottom surfaces may extend horizontally between one of the first and second vertical sidewalls and one of the first and second angled surfaces. A fourth example of the frame optionally includes one or more of the first though the third examples, and further includes wherein each of the bottom surfaces may extend horizontally between one of the first and second vertical sidewalls and one of the first and second angled sidewalls. A fifth example of the frame optionally includes one or more of the first though the fourth examples, and further includes wherein the inner surface may be a curved, concave surface and the optic element may be cylindrical. A sixth example of the frame optionally includes one or more of the first though the fifth examples, and further includes wherein the optic element may be a lens. A seventh example of the frame optionally includes one or more of the first though the sixth examples, and further includes wherein the optic element may be one of a cylindrical lens, rod lens, a Fresnel lens, or flat glass. An eighth example of the frame optionally includes one or more of the first though the seventh examples, and further includes wherein the optic element may be a coupling optic that may direct radiant output from a plurality of light emitting devices of the lighting system to a workpiece, where the workpiece may be a substrate with a photosensitive material applied to it. A ninth example of the frame optionally includes one or more of the first though the eighth examples, and further includes wherein one or more of the first and second angled surfaces and the first and second bottom surfaces may include one or more grooves, the one or more grooves extending from an exterior surface of the first and second angled surfaces and into and interior of the frame or extending from an exterior surface of the first and second bottom surface and into and interior of the frame. A tenth example of the frame optionally includes one or more of the first though the ninth examples, and further includes wherein one or more of the first and second angled surfaces and the first and second bottom surfaces may include surface texturing. An eleventh example of the frame optionally includes one or more of the first though the tenth examples, and further includes wherein the frame may comprise a black anodized material. A twelfth example of the frame optionally includes one or more of the first though the eleventh examples, and further includes wherein one or more of the first and second vertical sidewalls, the first and second bottom surfaces, and the first and second angled surfaces may be coated with a black anodized material.

The systems described above also provide for a lighting system, comprising a light source, a coupling optic positioned between the light source and a workpiece to be cured by light from the light source, and a frame coupled to an exterior, top surface of the coupling optic, the frame including vertical sidewalls extending to a point below or in level with an exterior, bottom surface of the coupling optic and angled sidewalls angled from the point and partially vertically toward the coupling optic. In a first example, the lighting system may additionally or alternatively include wherein the light source may be a light emitting device and wherein the light source may be positioned above the frame, at a top, open surface of the frame, the top, open surface of the frame being a window frame allowing light to pass from the light source to the coupling optic. A second example of the lighting system optionally includes the first example and further includes wherein the angled sidewalls may be angled inward toward a side of the coupling optic along a midsection of the coupling optic, the coupling optic including one or more of a rod lens, a cylindrical lens, a Fresnel lens, or flat glass. A third example of the lighting system optionally includes one or more of the first and the second examples, and further includes wherein the frame may further comprise bottom sidewalls that extend horizontally, in a direction perpendicular to the vertical sidewalls, each sidewall of the bottoms sidewalls extending from one of the vertical sidewalls to one of the angled sidewalls. A fourth example of the lighting system optionally includes one or more of the first though the third examples, and further includes wherein the frame at least partially comprises a black anodized material and wherein one or more of the angled sidewalls and the bottom sidewalls may include one or more of grooves and surface texturing, the one or more grooves extending from an exterior surface of the one of more angled sidewalls into an interior of the frame or extending from an exterior surface of the first and second bottom surface and into and interior of the frame. A fifth example of the lighting system optionally includes one or more of the first though the fourth examples, further comprising a dispenser mechanism containing photosensitive material arranged proximate to the frame.

The systems described above also provide for an optic holder of a lighting system, comprising a top surface coupled to a light source, first and a second bottom surface parallel to the top surface, first and a second vertical sidewall extending from the top surface to a respective one of the first and the second bottom surface, first and a second angled surface extending from a respective one of the first and the second bottom surface towards a central recessed surface, the central recessed surface capable of holding a rod lens, and wherein each of the first and the second angled surface include one or more cutouts extending to a length inside the optic holder towards the respective first and second vertical sidewall. In a first example, the optic holder may additionally or alternatively include wherein a radius of the central recessed surface may be substantially equal to a radius of the rod lens.

Note that the example baffle frame embodiments and optic assemblies included herein can be used with various lighting system configurations.

This concludes the description. The reading of it by those skilled in the art would bring to mind many alterations and modifications without departing from the spirit and the scope of the description. For example, lighting sources producing different wavelengths of light may take advantage of the present description.

The invention claimed is:

1. A frame for holding an optic element of a lighting system, comprising:
   a central, inner surface formed along a length of the frame and adapted to receive the optic element;
   first and second vertical sidewalls extending from a top surface to respective first and second bottom surfaces of the frame, the first and second bottom surfaces positioned below an exterior, bottom surface of the optic element when the optic element is mounted to the inner surface of the frame; and
   first and second angled surfaces, each angled from one of the first and second bottom surfaces extending partially vertically toward the inner surface.

2. The frame of claim 1, wherein the first and second angled surfaces are interior surfaces of the frame.

3. The frame of claim 1, wherein the first and second vertical sidewalls are arranged perpendicular to a workpiece upon which light from the optic element is directed.

4. The frame of claim 1, wherein the first and second bottom surfaces are arranged horizontally, in a direction perpendicular to the vertical sidewalls.

5. The frame of claim 1, wherein each of the first and second bottom surfaces extends horizontally between one of the first and second vertical sidewalls and one of the first and second angled surfaces.

6. The frame of claim 1, wherein the inner surface is a curved, concave surface and the optic element is cylindrical.

7. The frame of claim 1, wherein the optic element is one of a cylindrical lens, rod lens, a Fresnel lens, or flat glass.

8. The frame of claim 1, wherein the optic element is a coupling optic that directs radiant output from a plurality of light emitting devices of the lighting system to a workpiece, where the workpiece is a substrate with a photosensitive material applied to it.

9. The frame of claim 1, wherein one or more of the first and second angled surfaces, and the first and second bottom surfaces includes one or more grooves, one or more grooves extending from an exterior surface of the first and second angled surfaces and into an interior of the frame or extending from an exterior surface of the first and second bottom surface and into and interior of the frame.

10. The frame of claim 1, wherein one or more of the first and second angled surfaces and the first and second bottom surfaces includes surface texturing.

11. The frame of claim 1, wherein the frame comprises a black anodized material.

12. The frame of claim 1, wherein one or more of the first and second vertical sidewalls, the first and second bottom surfaces, and the first and second angled surfaces are coated with a black anodized material.

13. An optic holder of a lighting system, comprising:
a top surface coupled to a light source;
first and a second bottom surface parallel to the top surface;
first and a second vertical sidewall extending from the top surface to a respective one of the first and the second bottom surface;
first and a second angled surface extending from a respective one of the first and the second bottom surface towards a central recessed surface, the central recessed surface capable of holding a rod lens, and wherein each of the first and the second angled surface include one or more cutouts extending to a length inside the optic holder towards the respective first and second vertical sidewall.

14. The optic holder of claim 13, wherein a radius of the central recessed surface is substantially equal to a radius of the rod lens.

* * * * *